(12) United States Patent
Kim et al.

(10) Patent No.: US 7,433,002 B2
(45) Date of Patent: Oct. 7, 2008

(54) PRISM-PATTERNED BROADBAND REFLECTIVE POLARIZER FOR LIQUID CRYSTAL DISPLAY

(75) Inventors: Sung-Tae Kim, Gwanak-gu (KR); Ki-Cheol Yoon, Cheonan-si (KR); Keon-Il Kim, Yuseong-gu (KR); Jae-Chul Jung, Yuseong-gu (KR)

(73) Assignee: Samsung Fine Chemicals Co., Ltd., Ulsan (KR)

( * ) Notice: Subject to any disclaimer, the term of this patent is extended or adjusted under 35 U.S.C. 154(b) by 261 days.

(21) Appl. No.: 10/587,560

(22) PCT Filed: Mar. 25, 2005

(86) PCT No.: PCT/KR2005/000870

§ 371 (c)(1), (2), (4) Date: Jul. 31, 2006

(87) PCT Pub. No.: WO2006/038754

PCT Pub. Date: Apr. 13, 2006

(65) Prior Publication Data

US 2007/0159578 A1    Jul. 12, 2007

(30) Foreign Application Priority Data

Oct. 1, 2004    (KR) ............... 10-2004-0078416

(51) Int. Cl.
  *G02F 1/1335*    (2006.01)
(52) U.S. Cl. .................. 349/98; 349/96; 349/115

(58) Field of Classification Search .............. 349/96, 349/98, 115, 117
See application file for complete search history.

(56) References Cited

U.S. PATENT DOCUMENTS

| 5,050,966 A | 9/1991 | Berman |
| 5,235,443 A | 8/1993 | Barnik et al. |
| 6,016,177 A | 1/2000 | Motomura et al. |
| 6,061,108 A | 5/2000 | Anderson et al. |
| 6,088,079 A | 7/2000 | Kameyama et al. |
| 6,103,323 A | 8/2000 | Motomura et al. |
| 6,248,259 B1 | 6/2001 | Izumi et al. |

(Continued)

FOREIGN PATENT DOCUMENTS

JP    2003-149441    5/2003

(Continued)

*Primary Examiner*—Kevin S Wood
(74) *Attorney, Agent, or Firm*—The Webb Law Firm

(57) ABSTRACT

The present invention is related to a method of method of manufacture of a reflective polarizing film that can improve brightness of a liquid crystal display device remarkably by making a liquid crystal film that can cover visible light by using cholesteric liquid crystal layers having different selective light-reflection central wavelengths, attaching a quarter wave (¼ λ) retardation film on top of the liquid crystal film, and adding prism patterns to the opposite side of the liquid crystal film. The reflective polarizing film of the present invention is characterized by that two or more cholesteric liquid crystal layers having different selective reflection wavelength regions are laminated in order from a shorter wavelength to a longer wavelength, and brightness of a liquid crystal display device is maximized owing to an integrated film manufactured by attaching a ¼ λ retardation film onto cholesteric liquid crystal layers and forming prism patterns onto the opposite side.

17 Claims, 2 Drawing Sheets

U.S. PATENT DOCUMENTS

| | | | |
|---|---|---|---|
| 6,342,934 B1 * | 1/2002 | Kameyama et al. | 349/98 |
| 6,417,902 B1 | 7/2002 | Greenfield et al. | |
| 6,421,107 B1 | 7/2002 | Greenfield et al. | |
| 6,654,081 B2 * | 11/2003 | Kawamoto et al. | 349/96 |

FOREIGN PATENT DOCUMENTS

| | | |
|---|---|---|
| JP | 2003-279739 | 10/2003 |
| JP | 2003-315556 | 11/2003 |

* cited by examiner

PRISM-PATTERNED BROADBAND REFLECTIVE POLARIZER FOR LIQUID CRYSTAL DISPLAY

TECHNICAL FIELD

The present invention is related to a method of manufacture of a reflective polarizing film that can improve brightness of a liquid crystal display device remarkably by making a liquid crystal film that can cover visible light by using cholesteric liquid crystal layers having different selective light-reflection central wavelengths, attaching a quarter wave (¼ λ) retardation film on top of the liquid crystal film, and adding prism patterns to the opposite side of the liquid crystal film.

BACKGROUND ART

Liquid crystal display (hereinafter referred to as LCD) devices that have been used generally have employed polarizing films since they have used linearly polarized light. Polarizing films are fabricated by adsorbing an iodine or dichroic dye to a polyvinyl alcohol (PVA) film and stretching the adsorbed film in a fixed direction.

However, the polarizing films manufactured as described in the above are not practical in that they themselves have a weak mechanical strength with respect to the direction of a transmission axis and the function of polarization is lowered significantly as they are contracted by heat or moisture. In order to complement this deficiency, polarizing films having a structure in which an adhesive has been adhered to between supports such as an acetic acid cellulose film, etc. have been developed.

Since the polarizing films using the above polyvinyl alcohol films adsorb light progressing in one direction but pass only the light vibrating in another direction producing a linearly polarized light, the efficiency of the polarizing films can not exceed 50% theoretically, which is the most significant factor for lowering the efficiency and brightness of LCDs.

It is possible to improve greatly disadvantages of the conventional polarizing films by using reflective polarizing films additionally that are manufactured by using cholesteric liquid crystals. Cholesteric liquid crystals have a selective reflection characteristic. That is, the twisted direction of the spiral structure of liquid crystals and the oriented direction of circularly polarized light are consistent with each other, and cholesteric liquid crystals reflect only the circularly polarized light of which wavelength is the same as the spiral pitch of the liquid crystals. It is possible to manufacture polarizing films that can convert non-polarized light in a fixed wavelength band into a specific circularly polarized light by using the selective reflection characteristic.

In other words, if non-polarized light in which a left circularly polarized light component and a right circularly polarized light component are mixed equally is incident to a cholesteric liquid crystal film having a left- or right-handed spiral structure, the circularly polarized light of which direction is the same as the spiral direction is reflected, while the circularly polarized light of which direction is in the opposite direction to the spiral direction is transmitted. The transmitted circularly polarized light is converted to linearly polarized light after it passes thorough a ¼ λretardation film. The circularly polarized light reflected thus transmits the liquid crystal film since its polarization direction is changed if it is reflected again from a reflective plate. Accordingly, it is possible to improve brightness remarkably by using additionally polarizing films manufactured by using cholesteric liquid crystal films compared to the cases of using only the conventional absorption-type polarizing films that absorb 50% of light since there is no loss of light theoretically.

However, the backlight used for an LCD generates visible light (400-700 nm) that is in a region showing colors mainly. Therefore, the selective reflection wavelength region of a cholesteric liquid crystal film should cover the visible light region. If it fails to do, the light in a wavelength region that has not been utilized again after selective reflection transmits the polarizing film in a non-polarized state and brings about a problem of lowering the picture quality of the LCD.

Also, an LCD uses many kinds of functional films overlapped in the backlight unit, where brightness is lowered since light scattering phenomena occur at interfaces every time the light passes through each film. Among many kinds of LCD backlight films, prism-patterned films that can improve brightness by collecting the light generated from the light source to the front are used. Generally, prism films are manufactured in the coating method by forming prism patterns on the films. Two prism-patterned films are overlapped for them to be used, but they still have the problem of light scattering at interfaces as in the conventional methods.

DISCLOSURE OF THE INVENTION

It is, therefore, an object of the present invention to provide with a new reflective polarizing film for a liquid crystal display device with an improved brightness to the maximum compared to that of the conventional polarizing films by manufacturing an integrated reflective polarizing film by forming prism patterns on cholesteric liquid crystal films in order to prevent light scattering phenomena when the light passes through the films by removing interfaces between one film and another film.

More concretely, an object of the present invention is to manufacture a reflective polarizing film with an improved brightness of an LCD through integration by manufacturing a liquid crystal film that can cover visible light regions by laminating cholesteric liquid crystal layers having different selective reflection wavelength regions, attaching a ¼ λ retardation film (phase-difference film) to this film, and forming prism patterns onto the opposite side, as well as a method of manufacture of such reflective polarizing film.

Another object of the present invention is to provide with a liquid crystal display device equipped with the above reflective polarizing film.

In order to achieve the above-described objects, presented in the present invention is a method of improving brightness of a liquid crystal display device remarkably through integration by manufacturing a liquid crystal film covering visible light by laminating cholesteric liquid crystal layers having different selective reflection wavelength regions, attaching a ¼ λ retardation film to this film, and coating prism patterns onto the opposite side of this film.

The present invention is illustrated in more detail below:

In the present invention, a cholesteric liquid crystal film that is manufactured by dissolving a curable cholesteric liquid crystal material and a photoinitiator in an organic solvent, coating a substrate with the above mixed solvent, and curing or polarizing the coated substrate by irradiating with UV light. The above curable cholesteric liquid crystal material is comprised of a curable nematic liquid crystal material and a curable chiral material. It is possible to adjust selective reflection wavelength regions according to the compositions of these two materials.

Any liquid crystal materials containing a mesogenic radical showing nematic liquid crystallinity are acceptable for curable nematic liquid crystal materials and curable chiral materials, and any materials having usual chiral carbons are acceptable for chiral materials in the present invention. Also, curable materials refer to materials equipped with thermally or UV-reactive groups in their molecular structures. For example, in case of thermal curing, combination of monomers containing an alkenyl radical such as a vinyl radical, acrylic radical, methacrylic radical, vinylidene radical, aryl radical, etc., or having various reactive groups that can be condensation-polymerized may be used. As to UV curing radicals, any reactive groups that can be cross-linked by UV light such as a vinyl radical, acrylic radical, methacrylic radical, vinylidene radical, aryl radical, etc. among the above reactive groups may be used. For curing, an initiator and an additive such as a leveling agent, etc. may be used, if necessary.

When coating a liquid crystal material, a plastic film such as polyethylene terephthalate (PET), polyvinyl alcohol (PVA), triacetyl cellulose (TAC), etc. may be used as a substrate. The selective reflection characteristic may be granted to a cholesteric liquid crystal material if only a horizontal orientation is induced when it is coated. The methods of inducing this horizontal orientation include a method of forming a horizontal orientation film, applying an electric field, applying shear force, etc. usually.

Among the above methods, a method of inducing the orientation by applying shear force is used for the present invention. This is a method of inducing a horizontal orientation by using a method of coating such as roll coating, etc. when coating a cholesteric liquid crystal material.

A broadband cholesteric liquid crystal film that selectively reflects all of visible light regions is manufactured by laminating cholesteric liquid crystal layers having different selective reflection central wavelengths. Firstly, a solution in which a cholesteric liquid crystal material is dissolved is coated onto a plastic film in the roll coating method, the solvent is removed by passing it through a dryer, and a film is manufactured through the irradiation with UV. A circularly polarized separation layer, which is a broadband cholesteric liquid crystal film, that selectively reflects all of visible light regions, is manufactured by laminating thus manufactured cholesteric liquid crystal layers in order from a shorter wavelength to a longer wavelength by using an adhesive.

The light that has passed through thus manufactured cholesteric liquid crystal film may be used for an LCD if only it is converted to a linearly polarized light that is used for LCDs since it is in the circularly polarized light state. This difficulty is overcome by attaching a ¼ λ retardation film. Preferably, it is attached to the cholesteric liquid crystal layer side having the shortest wavelength.

The ¼ λ retardation film used in the above is made from PVA, PC, m-COC, etc., and has a retardation value of 115-125 nm. An integrated broadband reflective polarizing film is manufactured by forming prism patterns onto the opposite side where no retardation film is attached to. The above prism patterns are formed by coating a formulated solution of acrylate monomers and additives in the coating method without using a solvent, passing through a roll onto which prism patterns are etched, and irradiating with UV light for curing.

It is preferable to use oligomers or monomers having many benzene rings or their mixture, that are the resins that are cured by UV or electronic ray. Various monomers may be used as long as they have aromatic radicals. For example, oligomers having aromatic radicals such as bisphenol A polyphenylene diacrylate, dibromobisphenol A polyethoxylate diacrylate oligomer, etc., and monomers having aromatic radicals such as 2-hydroxy-3-phenoxy-propyl acrylate, bisphenol A diethylene diacrylate, etc. are used singly or in combination with each other. This composition with a photoinitiator curing the above oligomer and/or monomer added is used after it is cured with UV light.

As to prism patterns, a completely cured prism-patterned film is obtained by coating a substrate with a coating solution having a fixed thickness by using a gravia roll coating machine. or a comma coating machine, drying the solvent by using a dryer, and passing through a prism-patterned roll and a UV curing machine simultaneously. The thickness of the coating solution to be applied onto the substrate film through a coating machine is 10-45 µm, preferably, 15-25 µm. Prism patterns are formed by pressing down prism patterns carved in relief onto the coating side onto the substrate side where the coating solution is applied to and fixing the edges of the prism unit to the opposite side by using a UV curing machine. Preferably, the index of refraction is greater than 1.6, and the angle of a prism pattern is 50-150 degrees.

Also included in the scope of the present invention are an integrated broadband reflective polarizing film positioned between a backlight unit and a liquid crystal cell unit as well as a liquid crystal display device equipped with the above integrated broadband reflective polarizing film.

BRIEF DESCRIPTION OF THE DRAWINGS

The foregoing and other objects, aspects, and advantages will be better understood from the following detailed description of preferred embodiments of the invention with reference to the drawings, in which:

In FIG. 1, a prism-patterned integrated broadband reflective polarizing film using a broadband cholesteric liquid crystal film layer (20) of the present invention is shown. Cholesteric liquid crystal layers (2) are laminated onto the opposite side of the substrate film (4) having a prism-patterned layer (5) by using adhesive layers (1), and a ¼ λ retardation film (3) is laminated on top of the uppermost cholesteric liquid crystal layer.

Figure 1:
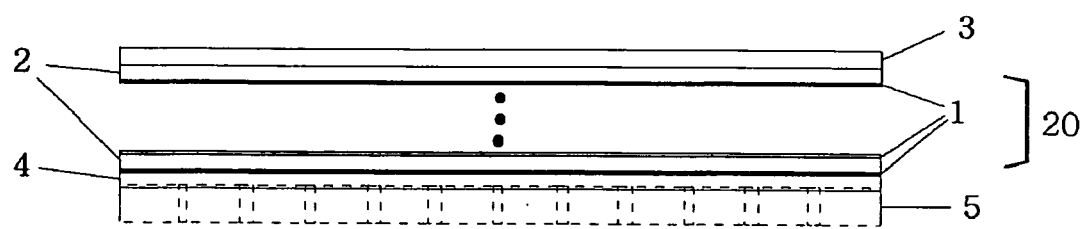
FIG. 1 is a cross-sectional view of a film of the present invention showing its structure.
Figure 2:
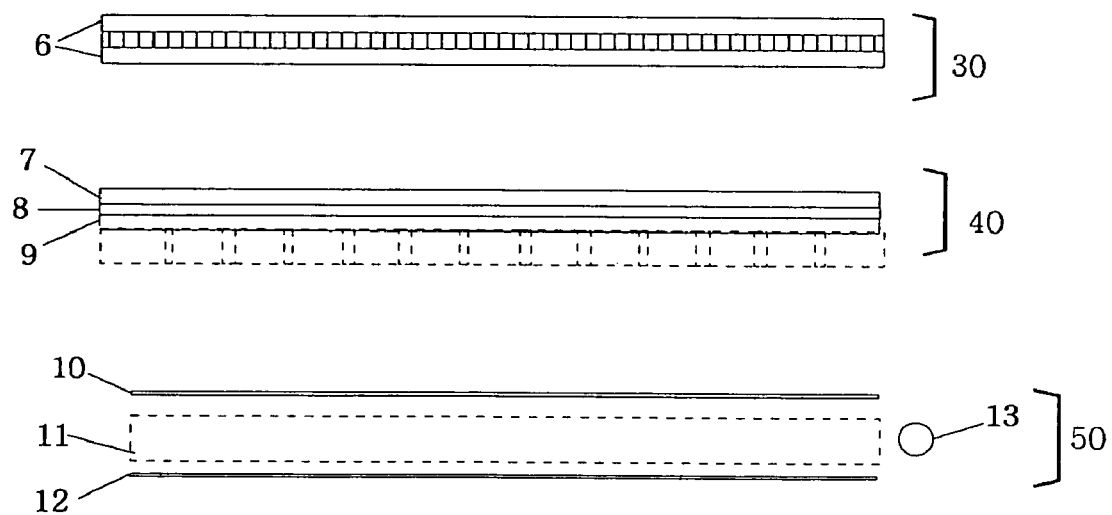
FIG. 2 is a cross-sectional view of a liquid crystal display device of the present invention showing its structure.

Shown in FIG. 2 is a liquid crystal display device manufactured by using the broadband cholesteric liquid crystal film of the present invention. A liquid crystal display device is comprised of a backlight unit (50) having a diffusion plate (10), light passing plate (11), and reflection plate (12); an integrated broadband reflective polarizing film (40) having prism patterns of the present invention; and a liquid crystal cell unit panel (30).

Further, in FIG. 2, reference numerals (6) refers to absorption-type polarizing films, (7) a retardation film, (8) an adhesive layer, (9) a cholesteric liquid crystal layer, and (13) a light source.

DESCRIPTION OF PREFERRED
EMBODIMENTS OF THE INVENTION

In the following discussion of the invention, there is shown a reflective polarizing film manufactured according to the present invention.

Preferred Embodiment 1

Firstly, a cholesteric liquid crystal film is manufactured. A solution of 50-weight % thermosetting cholesteric liquid crystal material (of BASF Company, LC242 and LC756) dissolved in a mixed solvent of methylethylketone (MEK) and toluene at a ratio of 6:4 is manufactured. Each solution is prepared for to have a selective reflection central wavelength of 430, 480, 520, 580, 650, or 720 nm by adjusting the ratio of mixing of the nematic material (LC242) and the chiral material (LC756), and a 5-weight % photoinitiator (IG184 of Ciba-Geigy Corporation) and a 0.2-weight % leveling additive (BYK361 of BYK Corporation) are added to each solution. Among the solutions manufactured in the above, firstly, the 430-nm solution is coated thinly onto a polyethylene terephthalate (PET) film in the roll coating method. After coating, the liquid crystal of the solution is oriented while drying the solvent in a dryer, after which a film is made through the irradiation with UV light. The drying condition is at a temperature of 85° C. and the irradiation with UV light is done by using a 300-W lamp (having the central wavelength of 360 nm).

Cholesteric liquid crystal layers having the central selective reflection wavelengths of 430, 480, 520, 580, 650, and 720 nm are manufactured by performing the above coating process repeatedly. These cholesteric liquid crystal layers are laminated in order from a shorter wavelength to a longer wavelength by using an adhesive, where the PET film is removed in order to have only liquid crystal layers laminated. The thickness of each liquid crystal layer thus manufactured is 3.5-4.5 microns, while that of the entire film is 25 microns.

Figure 3:
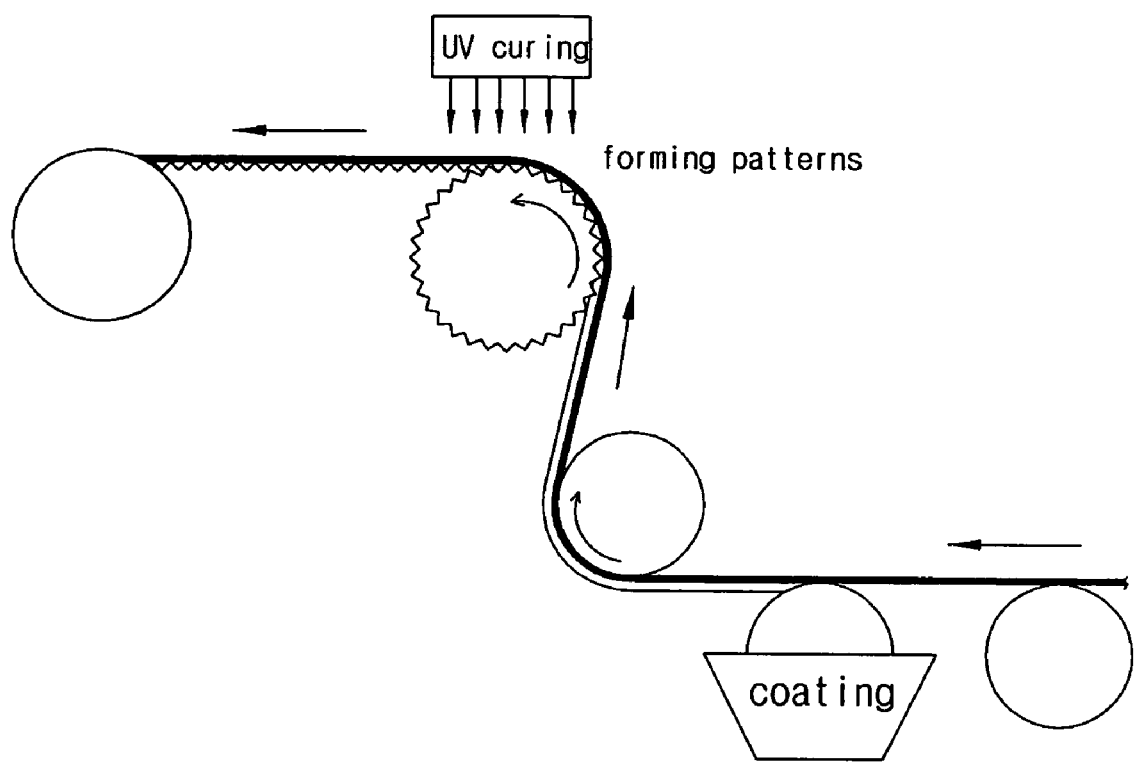
FIG. 3 shows a process of forming prism patterns of the present invention.

Onto the shorter wavelength side of the liquid crystal film manufactured as described in the above, a ¼ λ retardation film (having the central wavelength of 115 nm), on which a pressure-sensitive adhesive (PSA) is coated, is attached by compressing at a room temperature. Prism patterns are formed onto the opposite side where no retardation film is attached to by using a UV-curing resin. The index of refraction of the prism unit thus manufactured is 1.60, and the angle of the prism is 90 degrees. The UV-curing composition used for forming prism patterns is comprised of 60 weight % of the bisphenol A polyphenylene diacrylate oligomer and 40 weight % of the 2-hydroxy-3-phenoxy-propyl acrylate monomer. To this composition, 3 weight % of Darocure 1173, a photoinitiator of Merck Company, is added and mixed as a photoinitiator. The mixed composition is coated to have a thickness of 30 μm, and patterns are made by pressing down in order to fix the edges of the prism unit by passing through the UV-curing machine as shown in FIG. 3.

The result of measurement of brightness of the reflective polarizing film manufactured according to the present invention shows that brightness is improved by greater than 67% compared to the cases that absorption-type polarizing films (of NPF grade of Nitto Denko Company) are used.

Preferred Embodiment 2

Firstly, a cholesteric liquid crystal film is manufactured. A solution of 50-weight % thermosetting cholesteric liquid crystal material (of BASF Company, LC242 and LC756) dissolved in a mixed solvent of methylethylketone (MEK) and toluene at a ratio of 6:4 is manufactured. Each solution is prepared for to have a selective reflection central wavelength of 435, 485, 520, 570, 620, 670, or 730 nm by adjusting the ratio of mixing of the nematic material (LC242) and the chiral material (LC756), and a 5-weight % photoinitiator (IG184 of Ciba-Geigy Corporation) and a 0.2-weight % leveling additive (BYK361 of BYK Corporation) are added to each solution. Among the solutions manufactured in the above, firstly, the 435-nm solution is coated thinly onto a polyethylene terephthalate (PET) film in the roll coating method. After coating, the solvent is dried in a dryer, after which a film is made through the irradiation with UV light. The drying condition is at a temperature of 85° C. and the irradiation with UV light is done by using a 300-W lamp (having the central wavelength of 360 nm).

Cholesteric liquid crystal layers having the central selective reflection wavelengths of 435, 485, 520, 570, 620, 670, and 730 nm are manufactured by performing the above coating process repeatedly. These cholesteric liquid crystal layers are laminated in order from a shorter wavelength to a longer wavelength by using an adhesive, where the PET film is removed in order to have only liquid crystal layers laminated. The thickness of each liquid crystal layer thus manufactured is 3.5-4.5 microns, while that of the entire film is 25 microns.

Onto the shorter wavelength side of the liquid crystal film manufactured as described in the above, a ¼ λ retardation film (having the central wavelength of 115 nm), on which a pressure-sensitive adhesive (PSA) is coated, is attached by compressing at a room temperature. Prism patterns are formed onto the opposite side where no retardation film is attached to by using a UV-curing resin. The index of refraction of the prism unit thus manufactured is 1.60, and the angle of the prism is 90 degrees. The UV-curing composition used for forming prism patterns is comprised of 60 weight % of the dibromo bisphenol A polyethoxylate diacrylate oligomer and 40 weight % of the bisphenol A diethylene diacrylate monomer. To this composition, 3 weight % of Darocure 1173, a photoinitiator of Merck Company, is added and mixed as a photoinitiator. The mixed composition is coated to have a thickness of 20 μm, and patterns are made by pressing down in order to fix the edges of the prism unit by passing through the UV-curing machine as shown in FIG. 3.

The result of measurement of brightness of the reflective polarizing film manufactured according to the present invention shows that brightness is improved by greater than 71% compared to the cases that absorption-type polarizing films (of NPF grade of Nitto Denko Company) are used.

INDUSTRIAL APPLICABILITY

The prism-patterned reflective polarizing film of the present invention manufactured as described in the above has an effect of improving brightness of an LCD remarkably compared to the conventional absorption-type polarizing films since it collects the light that has passed through the diffusion plate effectively and reflects selectively all wavelength bands in the visible light region.

The results of measurement of brightness of the prism-patterned reflective polarizing film manufactured actually after it is mounted on an LCD panel show that brightness is 165, which means that brightness is improved by about 65%, assuming that brightness without using the reflective polarizing film of the present invention is 100.

While certain present preferred embodiments of the invention have been shown and described, it is to be distinctly understood that the invention is not limited thereto but may be otherwise variously embodies and practiced within the scope of the following claims.

What is claimed is:
1. A method of manufacture of an integrated broadband reflective polarizing film comprising the steps of:
   inducing the orientation of a cholesteric liquid crystal solution and coating a plastic film with said cholesteric liquid crystal solution to make a cholesteric liquid crystal coated layer;

manufacture of a cholesteric liquid crystal layer through light-irradiation onto said cholesteric liquid crystal coated layer;

manufacture of a circularly polarized light separation layer through laminating of two or more cholesteric liquid crystal layers having different selective reflection wavelength regions in order from a shorter wavelength to a longer wavelength;

laminating a retardation film onto said circularly polarized light separation layer; and forming prism patterns by using a UV-curing resin onto the opposite side of said retardation film.

2. The method of manufacture of an integrated broadband reflective polarizing film of claim 1, wherein said cholesteric liquid crystal solution is a mixture of a curable nematic liquid crystal material and a curable chiral liquid crystal material.

3. The method of manufacture of an integrated broadband reflective polarizing film of claim 1, wherein said laminating step includes a step of attaching a retardation film onto the shortest-wavelength cholesteric liquid crystal layer side of said circularly polarized light separation layer.

4. The method of manufacture of an integrated broadband reflective polarizing film of claim 1, wherein said prism patterns are formed by coating a UV-curing resin to have a thickness of 15-25 μm and passing through a roll having prism patterns etched to have an index of refraction of greater than 1.6.

5. The method of manufacture of an integrated broadband reflective polarizing film of claim 4, wherein the angle of said prism patterns is between 50 to 150 degrees.

6. An integrated broadband reflective polarizing film comprising two or more cholesteric liquid crystal layers having different selective reflection wavelength regions laminated in order from a shorter wavelength to a longer wavelength, a circularly polarized light separation layer having visible light regions as selective reflection wavelength regions, a retardation film laminated on top of said two or more cholesteric liquid crystal layers, and prism patterns formed onto the opposite side of said two or more cholesteric liquid crystal layers.

7. The integrated broadband reflective polarizing film of claim 6, wherein said cholesteric liquid crystal layers are manufactured by coating with a mixture of a curable nematic liquid crystal material and a curable chiral liquid crystal material and curing with UV light.

8. The integrated broadband reflective polarizing film of claim 6, wherein said prism patterns are formed by coating a UV-curing resin to have a thickness of 15-25 μm and passing through a roll having prism patterns etched to have an index of refraction of greater than 1.6.

9. The integrated broadband reflective polarizing film of claim 8, wherein the angle of said prism patterns is between 50 to 150 degrees.

10. A liquid crystal display device equipped with the integrated broadband reflective polarizing film in claim 6.

11. The liquid crystal display device of claim 10, wherein said integrated broadband reflective polarizing film is positioned between a backlight unit and a liquid crystal cell unit.

12. A liquid crystal display device equipped with the integrated broadband reflective polarizing film in claim 7.

13. The liquid crystal display device of claim 12, wherein said integrated broadband reflective polarizing film is positioned between a backlight unit and a liquid crystal cell unit.

14. A liquid crystal display device equipped with the integrated broadband reflective polarizing film in claim 8.

15. The liquid crystal display device of claim 14, wherein said integrated broadband reflective polarizing film is positioned between a backlight unit and a liquid crystal cell unit.

16. A liquid crystal display device equipped with the integrated broadband reflective polarizing film in claim 9.

17. The liquid crystal display device of claim 16, wherein said integrated broadband reflective polarizing film is positioned between a backlight unit and a liquid crystal cell unit.

* * * * *